United States Patent
Ward et al.

(10) Patent No.: US 11,077,846 B2
(45) Date of Patent: Aug. 3, 2021

(54) CONTROLLING AN AUTONOMOUS VEHICLE BASED UPON A PREDICTED IMMINENT LANE CHANGE

(71) Applicant: GM Cruise Holdings LLC, San Francisco, CA (US)

(72) Inventors: Christopher Ward, Kensington, CA (US); Ted Nitz, Hayward, CA (US); Curt Harrington, San Francisco, CA (US); Christopher Daily-Diamond, Oakland, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 187 days.

(21) Appl. No.: 16/371,005

(22) Filed: Mar. 31, 2019

(65) Prior Publication Data
US 2020/0307565 A1    Oct. 1, 2020

(51) Int. Cl.
*B60W 30/09*    (2012.01)
*G05D 1/00*    (2006.01)
(Continued)

(52) U.S. Cl.
CPC ........ *B60W 30/09* (2013.01); *B60W 30/0956* (2013.01); *G05D 1/0088* (2013.01);
(Continued)

(58) Field of Classification Search
CPC ............. B60W 30/09; B60W 30/0956; B60W 2554/80; G05D 1/0088; G05D 2201/0213; G06K 9/00825; G08G 1/167
(Continued)

(56) References Cited

U.S. PATENT DOCUMENTS 8,706,347 B2    4/2014    Bae et al.
8,825,295 B2    9/2014    Turner
(Continued)

OTHER PUBLICATIONS

Lai, et al., "Estimation of Moving Vehicle Locations Using Wheel Shape Information in Single 2-D Lateral Vehicle Images by 3-D Computer Vision Techniques", In Robotics and Computer-Integrated Manufacturing, vol. 15, No. 2, 1999, pp. 111-120.
(Continued)

*Primary Examiner* — Yazan A Soofi
(74) *Attorney, Agent, or Firm* — Medley, Behrens & Lewis, LLC (57) ABSTRACT

An autonomous vehicle is described, wherein the autonomous vehicle is configured to estimate a change in direction of a vehicle that is on a roadway and is proximate to the autonomous vehicle. The autonomous vehicle has a mechanical system, one or more sensors that generate one or more sensor signals, and a computing system in communication with the mechanical system and the one or more sensors. The autonomous vehicle is configured to detect an imminent lane change by another vehicle based on at least one of a computed angle between a wheel of the other vehicle and a longitudinal direction of travel of the other vehicle, a degree of misalignment between the wheel of the other vehicle and a body of the other vehicle, and/or an eccentricity of the wheel of the other vehicle. The mechanical system of the autonomous vehicle is controlled by the computing system based upon the detected imminent lane change.

20 Claims, 7 Drawing Sheets

(51) Int. Cl.
  *G08G 1/16* (2006.01)
  *G06K 9/00* (2006.01)
  *B60W 30/095* (2012.01)

(52) U.S. Cl.
  CPC ......... *G06K 9/00825* (2013.01); *G08G 1/167* (2013.01); *B60W 2554/80* (2020.02); *G05D 2201/0213* (2013.01)

(58) Field of Classification Search
  USPC .......................................................... 701/301
  See application file for complete search history.

(56) References Cited

U.S. PATENT DOCUMENTS

| | | | |
|---|---|---|---|
| 9,600,768 B1 | 3/2017 | Ferguson | |
| 9,701,307 B1* | 7/2017 | Newman | B60W 10/184 |
| 10,127,465 B2 | 11/2018 | Cohen et al. | |
| 10,155,534 B2 | 12/2018 | Varunjikar et al. | |
| 10,156,850 B1 | 12/2018 | Ansari et al. | |
| 2008/0119986 A1 | 5/2008 | Wei et al. | |
| 2009/0043443 A1 | 2/2009 | Wei et al. | |
| 2009/0287375 A1 | 11/2009 | Lavoie et al. | |
| 2015/0158525 A1 | 6/2015 | Pastor et al. | |
| 2016/0291145 A1* | 10/2016 | Zeng | G01S 13/723 |
| 2018/0029592 A1* | 2/2018 | Trombley | G08G 1/166 |
| 2018/0134281 A1* | 5/2018 | Newman | B60W 10/04 |
| 2018/0134284 A1* | 5/2018 | Newman | B62D 6/001 |

OTHER PUBLICATIONS

Sivaraman, et al., "Looking at Vehicles on the Road: A Survey of Vision-Based Vehicle Detection, Tracking, and Behavior Analysis.", In IEEE Transactions on Intelligent Transportation Systems, vol. 14, No. 4, Dec. 2013, pp. 1773-1795.

* cited by examiner

CONTROLLING AN AUTONOMOUS VEHICLE BASED UPON A PREDICTED IMMINENT LANE CHANGE

BACKGROUND

An autonomous vehicle is a motorized vehicle that can navigate without a human driver. An exemplary autonomous vehicle includes a plurality of sensor systems such as, but not limited to, a camera sensor system, a lidar sensor system, a radar sensor system, amongst others, wherein the autonomous vehicle is controlled based upon sensor signals output by the sensor systems. The sensor signals are provided to a computing system in communication with the plurality of sensor systems, wherein the sensor signals capture objects in proximity to the autonomous vehicle, such as other vehicles. The sensor signals are processed by the computing system and, based upon detection of object(s) captured in the sensor signals and other factors (such as road geometry, speed limit, etc.), the computing system controls mechanical system(s) of the autonomous vehicle (e.g., a vehicle prdata sopulsion system, a braking system, and/or a steering system). For example, the computing system can detect an object in an environment of the autonomous vehicle, compute a current trajectory of the object, and predict a future location of the object based upon the computed trajectory of the object.

In some scenarios, however, it can be difficult to accurately predict a future location of an object and/or a future direction of travel of the object, particularly when the object is a vehicle driven by a human, as humans often exhibit unexpected driving behavior. For example, a vehicle operated by a human driver can unexpectedly (and quickly) change lanes near the autonomous vehicle without much notice. Difficulties in predicting future locations and/or future directions of travel of objects that may exhibit unpredictable behavior, such as human-driven vehicles, may in turn cause difficulties when navigating autonomously on a roadway.

For example, close cut-ins (by vehicles controlled by human drivers) from an adjacent lane to a lane of the autonomous vehicle have been identified as a concern for autonomous vehicles. Such cut-ins may occur, for example, when an aggressive driver attempts to change lanes into a small gap in front of the autonomous vehicle or when a non-alert driver does not see the autonomous vehicle and change lanes. Because a change of direction of a vehicle that performs a close cut-in happens relatively quickly, it is difficult for an autonomous vehicle to predict the close cut-in.

SUMMARY

The following is a brief summary of subject matter that is described in greater detail herein. This summary is not intended to be limiting as to the scope of the claims.

Described herein are various technologies pertaining to an autonomous vehicle that is configured to detect an unexpected (and relatively quick) change of direction, such as is associated with aggressive cut-ins by vehicles operated by human drivers. Also described herein are various technologies pertaining to controlling operation of the autonomous vehicle responsive to the autonomous vehicle detecting such change of direction. Therefore, in an example, an autonomous vehicle described herein is configured to pre-emptively detect a lane change by another vehicles. To that end, the autonomous vehicle can compute an angle between a wheel of another vehicle and a longitudinal direction of travel of the other vehicle and can predict a forthcoming change of direction of the other vehicle based upon this computed angle. In another example, the autonomous vehicle can compute a degree of misalignment between the wheel of the other vehicle and a body of the other vehicle and can predict a forthcoming change of direction of the other vehicle based upon the computed degree of misalignment. In still yet another example, the autonomous vehicle can identify an eccentricity of the wheel of the other vehicle and can predict a forthcoming change of direction of the other vehicle based upon the identified eccentricity of the wheel of the other vehicle.

The autonomous vehicle described herein comprises a mechanical system, one or more sensors (e.g., an image sensor, a lidar sensor, a radar sensor, a thermal sensor, etc.) that generate one or more sensor signals, and a computing system in communication with the mechanical system and the one or more sensors. The computing system includes a processor and memory that stores instructions that are executed by the processor.

In an exemplary embodiment, the computing system identifies a longitudinal direction of travel of another vehicle based on the one or more sensor signals generated by the one or more sensors and computes an angle between a line that diametrically bisects a wheel of the other vehicle and the longitudinal direction of travel of the other vehicle. The longitudinal direction of travel can be identified based on a difference between a first position of the other vehicle determined at a first time and a second position of the other vehicle determined at a second time. The mechanical system of the autonomous vehicle is then controlled based on the computed angle. For example, the mechanical system may be controlled to bias a position of the autonomous vehicle within a lane of the autonomous vehicle based upon the computed angle of the wheel of the other vehicle with respect to the longitudinal direction of travel. The autonomous vehicle may identify, based on the computed angle, that the other vehicle is biasing toward a boundary of a lane in which the autonomous vehicle is travelling and, responsive thereto, infer that the other vehicle is maneuvering into the lane of the autonomous vehicle, wherein the mechanical system is further controlled based upon the inference. Additionally or alternatively, a horn of the autonomous vehicle may be activated based on predicted lateral direction of travel of the other vehicle to alert a driver of the other vehicle that the autonomous vehicle is nearby, wherein the predicted lateral direction of travel is determined from the computed angle referenced above.

In another exemplary embodiment, the computing system is configured to identify a degree of misalignment between a wheel of the other vehicle and a body of the other vehicle based on the one or more sensor signals generated by the one or more sensors, wherein the degree of misalignment is indicative of expected lateral movement by the other vehicle. A longitudinal speed of the other vehicle is also determined based on the one or more sensor signals. The computing system can compute an expected trajectory of the other vehicle based on the longitudinal speed and the degree of misalignment, and can control the mechanical system based on the computed expected trajectory of the other vehicle. The expected trajectory may be computed based upon a determined position of the wheel of the other vehicle relative to the one or more sensors.

In still another exemplary embodiment, the computing system is configured to identify an eccentricity of a wheel of another vehicle as captured in the one or sensor signals generated by the one or more sensors, wherein the eccentricity of the wheel is indicative of expected lateral movement by the other vehicle. For example, the computed angle referenced above and/or the degree of misalignment referenced above may be identified based on the identified eccentricity of the wheel. A position of the one or more sensors relative to the wheel of the other vehicle is also determined based on the one or more sensor signals. The computing system can computes an expected lateral movement by the other vehicle based on the position of the one or more sensors relative to the wheel and the eccentricity of the wheel as captured in the sensor signals (e.g., the eccentricity of the wheel as captured in the sensor signals is dependent upon the position of the one or more sensors relative to the wheel of the other vehicle). The computing system can control the mechanical system based on the expected lateral movement by the other vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to autonomous vehicles are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean serving as an illustration or example of something and is not intended to indicate a preference.

As used herein, "a line that diametrically bisects" is not limited to a line that passes through a center of a circle, and is intended to include secant lines that extend across the circle at other positions, particularly secant lines that are parallel to a surface that tangentially contacts the circle proximate to its base.

Figure 1:
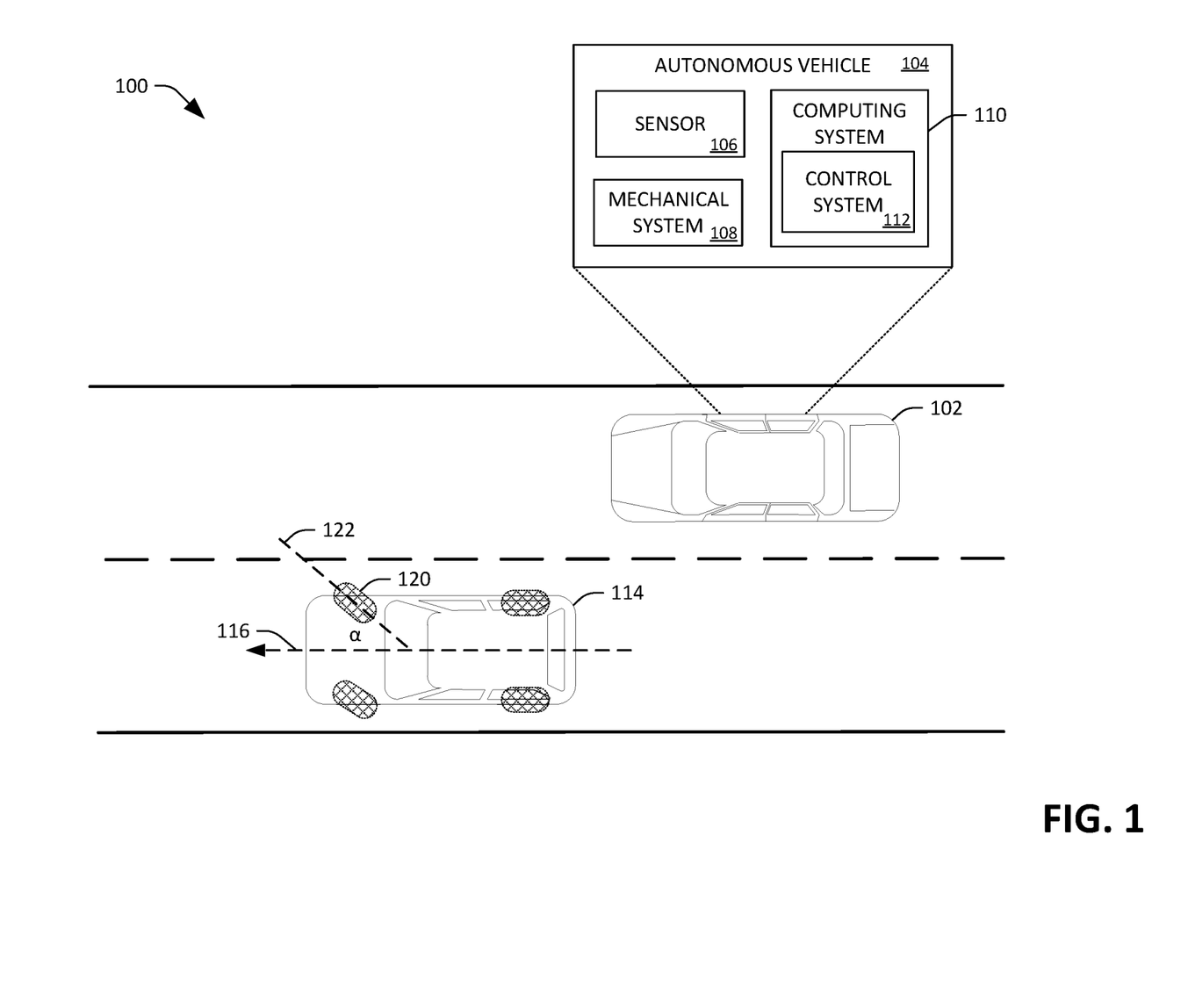
FIG. 1 is a schematic that illustrates an autonomous vehicle that is configured to predict a change in direction of another vehicle.

With reference now to FIG. 1, an exemplary environment 100 is illustrated that includes an autonomous vehicle 102 configured to navigate without a human driver and another vehicle 114, which may be a human-driven vehicle that can exhibit unpredictable behavior. The autonomous vehicle 102 includes componentry depicted in call-out 104. Hence, the autonomous vehicle 102 comprises a sensor 106 that generates a sensor signal, a mechanical system 108 (e.g., a vehicle propulsion system, a steering system, a braking system, etc.), and a computing system 110 having a control system 112 incorporated therein. The computing system 110 is in communication with the sensor 106 and the mechanical system 108. More specifically, the control system 112 is configured to control the mechanical system 108 based on the sensor signal generated by the sensor 106.

The sensor 106 may be, but is not limited to, a lidar sensor, an image sensor, a thermal sensor, a radar sensor, a global positioning system (GPS) sensor, an inertial measurement units (IMU), an infrared sensor, a laser sensor, a sonar sensor, and the like. For instance, the sensor 106 may generate a sensor signal that captures a wheel 120 of the other vehicle 114. It is to be understood that the autonomous vehicle 102 may include multiple sensors and that multiple sensor signals generated by the sensors can capture the wheel 120 of the other vehicle 114. For instance, a thermal sensor may be configured to sense the wheel 120 of the other vehicle 114 due to surface friction from the road that causes the rubber around the wheel 120 to increase in temperature when the other vehicle 114 is being driven.

The sensor 106 outputs a sensor signal that is received by the computing system 110, and the control system 112 processes the sensor signal to predict a change in direction of the vehicle 114 and control the mechanical system 108 based upon the predicted change in direction of the vehicle 114. With more particularity, and in an example, the control system 112 is configured to pre-emptively identify (i.e., predict) a lane change that is to be performed by the other vehicle 114 when the other vehicle 114 is proximate to the autonomous vehicle 102. Pre-emptive identification of a lane change can improve a reaction time of the autonomous vehicle 102 for responding to the lane change. As will be described in greater detail herein, the control system 112 may identify a longitudinal direction of travel 116 of the other vehicle 114 based on the sensor signal output by the sensor 106. The control system 112 can compute the longitudinal direction of travel 116 by computing a first position of the other vehicle 114 at a first time and a second position of the other vehicle 114 at a second time, wherein the longitudinal direction of travel 116 travels through the first position and the second position. For example, a feature of the other vehicle 114 detected at the first position and the second position can be indicative of the longitudinal direction of travel 116. Additionally or alternatively, the control system 112 can infer that the longitudinal direction of travel 116 is parallel to a lane of a road upon which the other vehicle 114 is travelling. In another example, the control system 112 can compute a longitudinal direction of travel of the autonomous vehicle 102 (e.g., based upon the sensor signal output by the sensor 106 and map data), and can define the longitudinal direction of travel 116 of the other vehicle 114 based on the computed longitudinal direction of the autonomous vehicle 102.

In addition, the control system 112 can identify an angle $\alpha$ between a line 122 that diametrically bisects the wheel 120 of the other vehicle 114 and the longitudinal direction of travel 116 based on the sensor signal output by the sensor 106. For example, the sensor signal may capture an eccentricity (e.g., oval shape) of the wheel 120 from a perspective of the sensor 106, the control system 112 can identify eccentricity of the wheel captured in the sensor signal, and the control system 112 can compute the angle $\alpha$ based upon the identified eccentricity of the wheel. The control system 112 can further compute the angle $\alpha$ based upon a computed position of the wheel 120 of the other vehicle 114 relative to a position of the sensor 106 (since the eccentricity of the wheel 120 captured in the sensor signal is dependent upon a geometric position of the wheel 120 of the other vehicle 114 relative to the sensor 106).

The control system 112 can control the mechanical system 108 based upon the computed angle $\alpha$. For example, the control system 112 can control the mechanical system 108 to bias a position of the autonomous vehicle 102 within a lane of the autonomous vehicle 102 based upon the computed angle $\alpha$ (e.g., $\alpha$ may be indicative of an impending lane change by the other vehicle 114). Biasing the autonomous vehicle 102 within the lane of the autonomous vehicle 102 can include longitudinal biasing, lateral biasing, and other directions of biasing (e.g., by braking, accelerating, or maneuvering the autonomous vehicle 102 within the lane of the autonomous vehicle 102). In another example, the control system 112 can identify that the other vehicle 114 is biasing toward a boundary of a lane in which the autonomous vehicle 102 is travelling based upon the sensor signal output by the sensor 106. The control system 112 can, responsive to identifying that the other vehicle 114 is biasing in the manner described above, predict that the other vehicle 114 is maneuvering into the lane of the autonomous vehicle 102 based upon the computed angle $\alpha$. The control system 112 can control the mechanical system 108 based upon the inference and the computed angle $\alpha$. Additionally, the control system 112 can identify that the other vehicle 114 is in the lane of the autonomous vehicle 102 (e.g., the other vehicle 114 may have merged lanes) and is biasing toward the autonomous vehicle 102 and/or toward an expected trajectory of the autonomous vehicle 102. The control system 112 can control the mechanical system 108 so that an expected trajectory of the other vehicle 114 and an expected trajectory of the autonomous vehicle 102 do not intersect at a same time.

The control system 112 may further determine a distance of the other vehicle 114 relative to the sensor 106 and a speed of the other vehicle 114 in the longitudinal direction of travel 116. In addition, the control system 112 can control the mechanical system 108 based upon the computed distance and speed. In some cases, the control system 112 can determine that a predicted lane change by the other vehicle 114 does not require an immediate response by the autonomous vehicle 102. In other cases, when the predicted change in direction of the other vehicle 114 (as computed by the control system 112) may interfere with the operation of the autonomous vehicle 102, the control system 112 can proactively control the mechanical system 108 based upon the computed angle $\alpha$. For example, the control system 112 can cause the autonomous vehicle 102 to bias away from the other vehicle 114, may cause the autonomous vehicle 102 to rapidly brake, may cause the autonomous vehicle 102 to activate a horn of the autonomous vehicle 102, and so forth.

Figure 2:
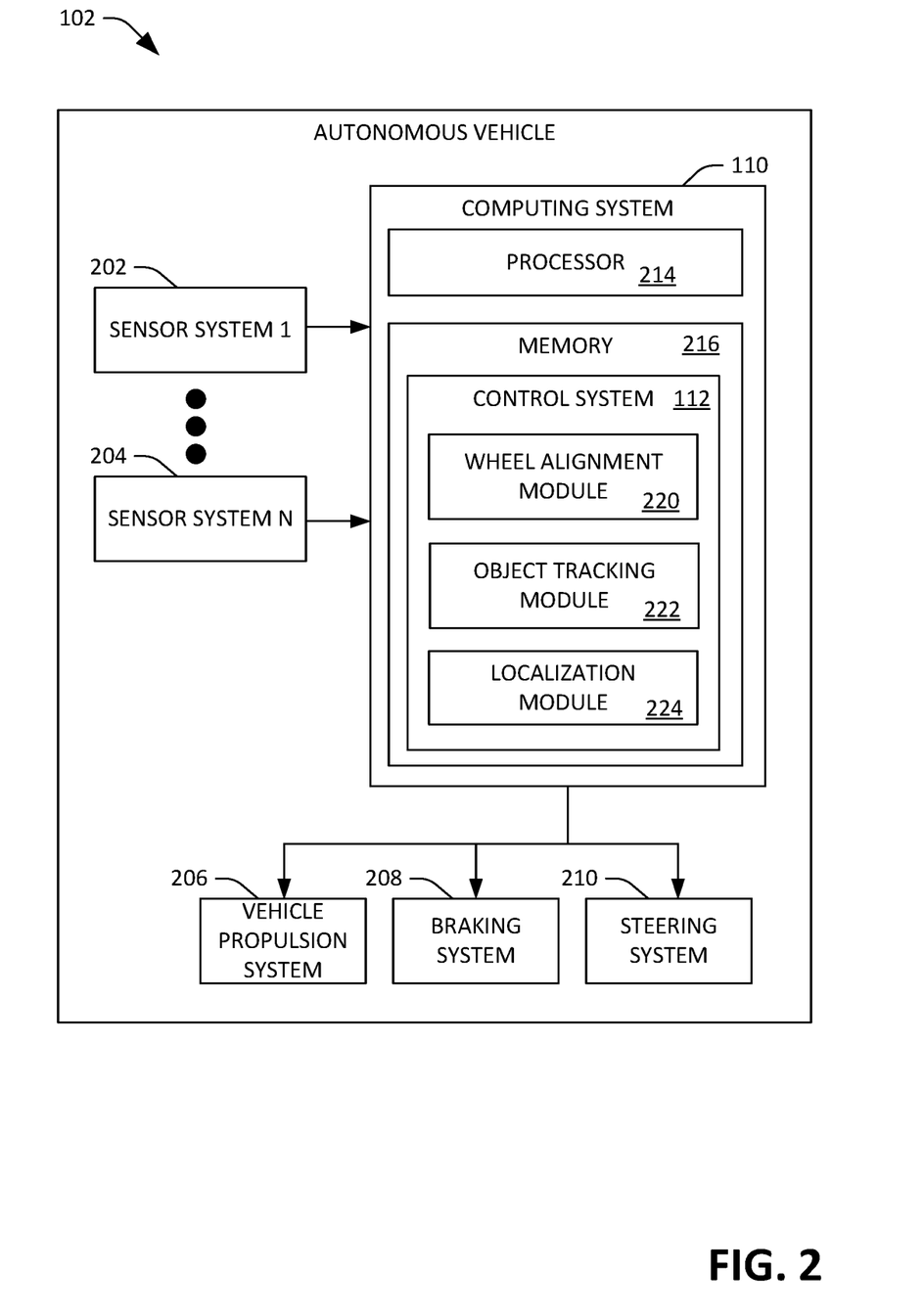
FIG. 2 is a functional block diagram of an exemplary autonomous vehicle.

With reference now to FIG. 2, a functional block diagram of the autonomous vehicle 102 is illustrated. The autonomous vehicle 102 operates based on sensor signals output by sensor systems 202-204 of the autonomous vehicle 200 (which, while not shown, can include the sensor system 106). The autonomous vehicle 102 includes a plurality of sensor systems 202-204 (a first sensor system 202 through an Nth sensor system 204). The sensor systems 202-204 can be of different types and are arranged about the autonomous vehicle 102. For example, the first sensor system 202 may be a camera sensor system and the Nth sensor system 204 may be a lidar sensor system. Furthermore, some or all of the of sensor systems 202-204 may be articulating sensors that can be oriented or rotated such that a field of view of the articulating sensors is directed towards different regions surrounding the autonomous vehicle 102.

The autonomous vehicle 102 further includes several mechanical systems that can be used to effectuate appropriate motion of the autonomous vehicle 102. For instance, the mechanical systems can include but are not limited to a vehicle propulsion system 206, a braking system 208, and a steering system 210. The vehicle propulsion system 206 may include an electric motor, an internal combustion engine, or both. The braking system 208 can include an engine brake, actuators, and/or any other suitable componentry that is configured to assist in decelerating the autonomous vehicle 102. The steering system 210 includes suitable componentry that is configured to control the direction of movement of the autonomous vehicle 102 during propulsion.

The autonomous vehicle 102 additionally comprises the computing system 110 that is in communication with the sensor systems 202-204 and the mechanical systems 206-210. The computing system 110 includes a processor 214 and memory 216 that includes instructions that are executed by the processor 214. In an example, the processor 214 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Memory 216 includes the control system 112, wherein the control system 112 comprises a wheel alignment module 220, an object tracking module 222, and a localization module 224. The wheel alignment module 220 is configured to receive sensor signals that capture a wheel of the other vehicle 114 and is further configured to determine whether the other vehicle 114 is expected to stray from its current longitudinal direction of travel. For example, the wheel alignment module 220 can identify, based on the sensor signals, that an eccentricity of the wheel 120 of the other vehicle 114 and/or a degree of misalignment between the wheel 120 of the other vehicle 114 and a body of the other vehicle 114 is indicative of expected lateral movement by the other vehicle 114. In particular, a large minor axis in the wheel as captured by one or more of the sensor signals is indicative of a sharper lateral movement by the other vehicle 114. Similarly, a greater degree of misalignment between a plane of the wheel and a body of the other indicative is indicative of sharper lateral movement by the other vehicle 114.

The object tracking module 222 is configured to track and predict movement by an object, such as the vehicle 114, in both the lateral and longitudinal directions. Hence, the object tracking module 222 can compute the trajectory of the other vehicle 114 in time as the other vehicle moves in its environment. In addition, the object tracking module 222 can identify a velocity of the other vehicle 114, wherein the control system 112 can control one or more of the mechanical systems 206-210 based upon the identified velocity (and further based upon the eccentricity of the wheel 120 and/or the angle of misalignment described above). In addition, the control system 112 can predict lateral movement of the other vehicle 114 based upon the velocity computed by the object tracking module 222.

The localization module 224 is configured to localize the autonomous vehicle 200 with respect to the position of the other vehicle 114 and/or the expected trajectory of the other vehicle 114 based upon sensor signals output by the sensor systems 202-204. More specifically, the localization module 224 can have access to a profile of the autonomous vehicle 102, wherein the profile includes a physical profile of the autonomous vehicle 102 (including locations of the sensors on the autonomous vehicle 102 and locations of the front, back, and sides of the autonomous vehicle 102 relative to the sensor systems 202-204). The localization module 224 is configured to determine a position of the wheel 120 of the other vehicle 114 relative to the position of the sensor systems 202-204, and the control system 112 can control the mechanical systems 206-210 based upon the determined position of the wheel 120 relative to the position of the sensor systems 202-204. For example, the control system 112 can ascertain the eccentricity of the wheel 120 and can further compute the angle α based upon the eccentricity of the wheel 120 and the position of the wheel 120 relative to the position of the sensors 202-204.

In connection with computing a position of the wheel 120 relative to a position of the sensor systems 202-204, the localization module 224 can compute a distance of the other vehicle 114 to the autonomous vehicle based upon the sensor signals output by the sensor systems 202-204. The control system 112 can control the mechanical systems 206-210 based upon this computed distance. For instance, the control system 112 can control the mechanical systems 206-210 to bias a position of the autonomous vehicle 102 within a lane of the autonomous vehicle 102 based upon the distance between the autonomous vehicle 102 and the other vehicle 114 and further based upon a predicted change in direction of the other vehicle 114.

Figure 3:
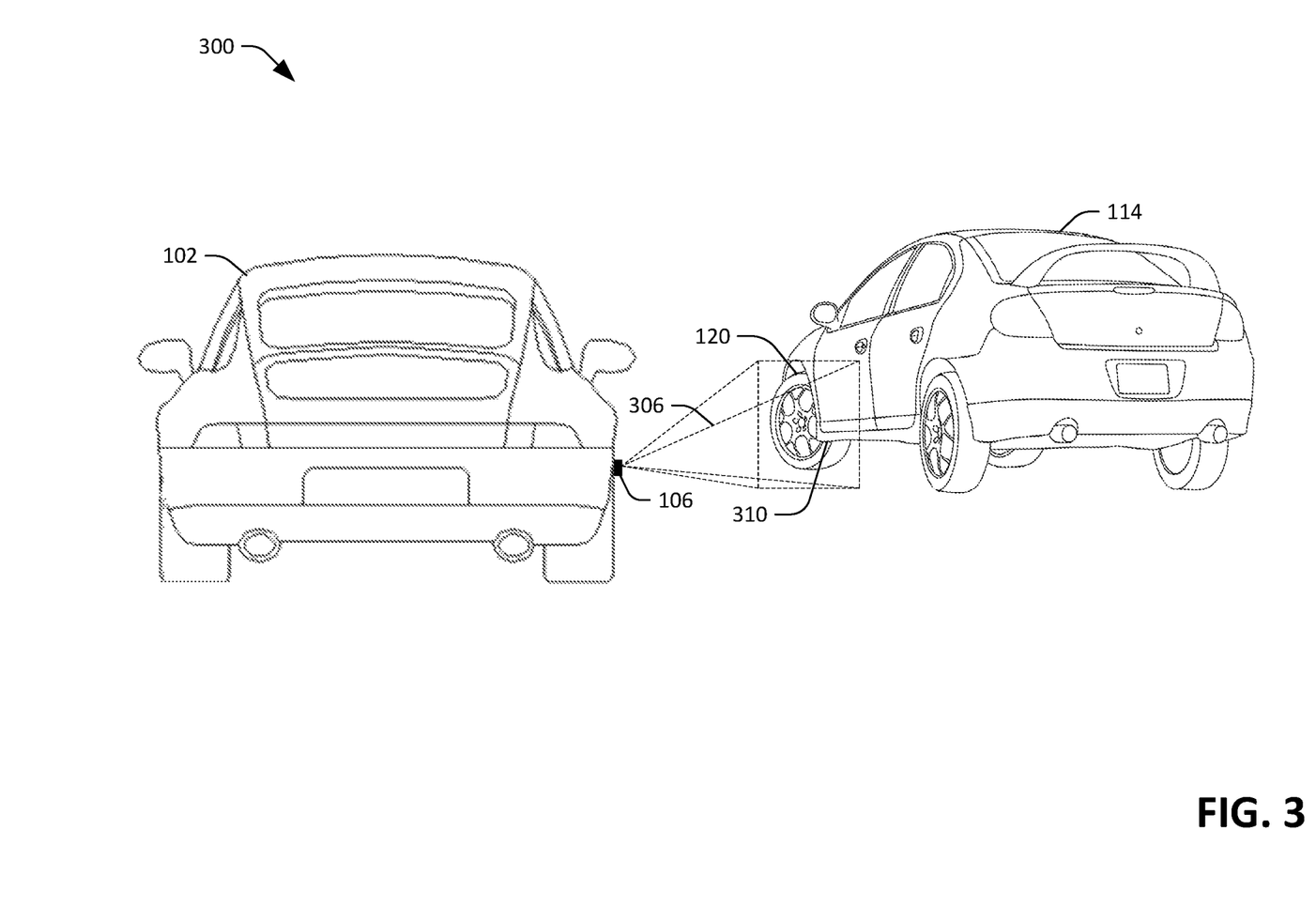
FIG. 3 is a schematic that depicts an autonomous vehicle with a sensor thereon that is configured to generate a sensor signal that captures a wheel of another vehicle.

With reference now to FIG. 3, a schematic that illustrates an exemplary environment 300 within which the autonomous vehicle 102 can operate is illustrated. In the example illustrated in FIG. 3, the autonomous vehicle 102 includes the sensor system 106, wherein the sensor generates a sensor signal that captures objects in a field of view 306 of the sensor system 106. In this example, the sensor system 106 is positioned near a wheel-well of the autonomous vehicle 102, such that the field of view 306 of the sensor system 106 is configured to include the wheel 120 of the other vehicle 114. Based on the sensor signal output by the sensor system 106, the control system 112 of the autonomous vehicle 102 is configured to identify an eccentricity of the wheel 120 and a position of the wheel 120 relative to the sensor system 106. The control system 112 can compute expected lateral movement by the other vehicle 114 based upon the eccentricity of the wheel 120 and the position of the wheel 120 relative to the sensor system 106. The control system 112 controls a mechanical system of the autonomous vehicle 102 based on the expected lateral movement by the other vehicle 114.

The control system 112 can additionally compute a degree of misalignment between the wheel 120 of the other vehicle 114 and a body 310 of the other vehicle 114 based on the eccentricity of the wheel 120 of the other vehicle 114 or from other suitable technique(s) performed by the control system 112 based upon the sensor signal output by the sensor system 106. For instance, the sensor system 106 may be a lidar system that generates a point cloud that represents the wheel 120 of the other vehicle 114 and a portion of the body 310 (e.g., the fender) of the other vehicle 114. The control system 112 can predict a change in direction of the other vehicle 114 (and an amount of the change in direction) based upon the degree of misalignment between the wheel 120 and the body 310.

Figure 4:
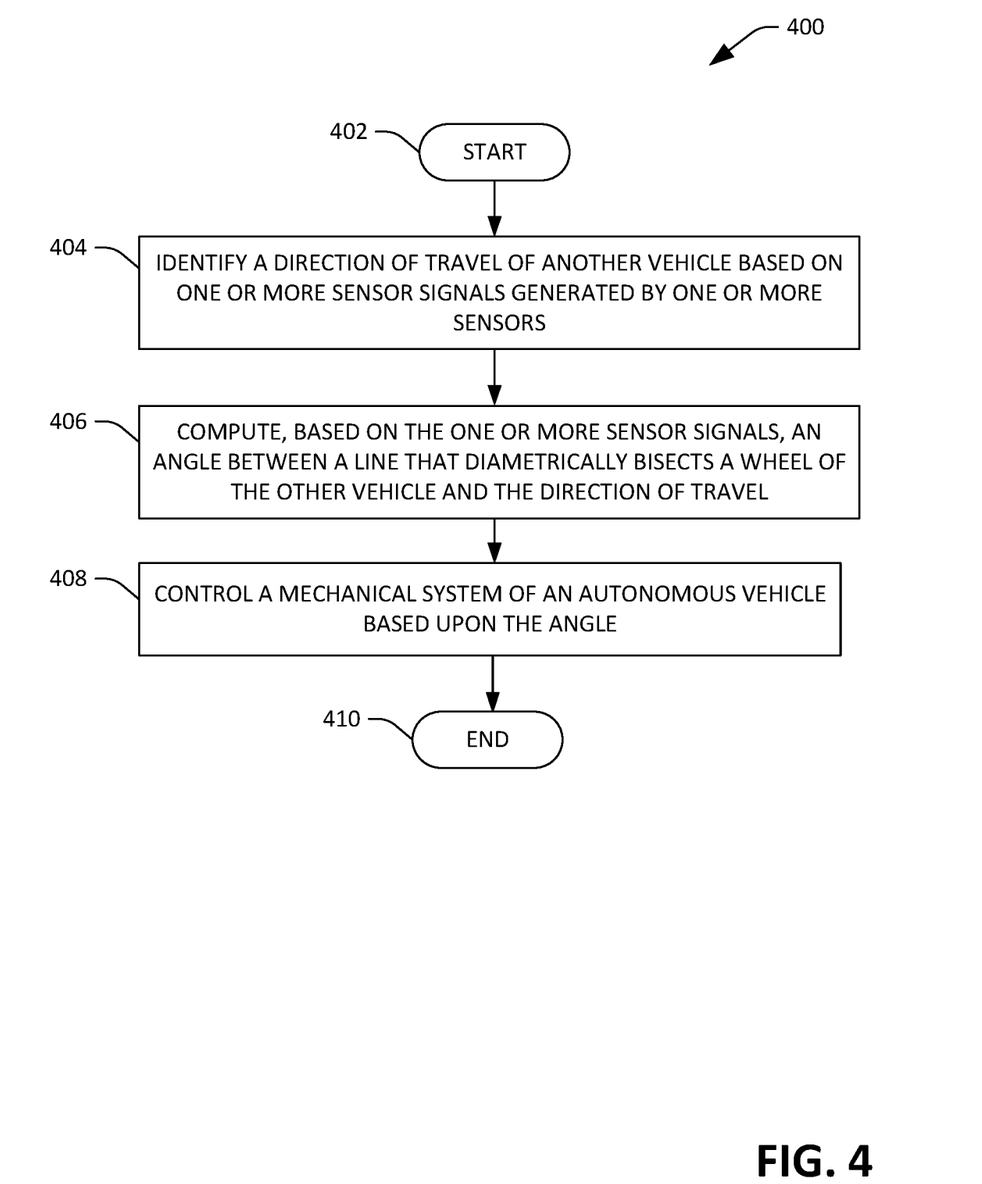
FIG. 4 is a flow diagram illustrating an exemplary methodology for controlling a mechanical system of an autonomous vehicle based on a predicted change in direction of another vehicle.
Figure 5:
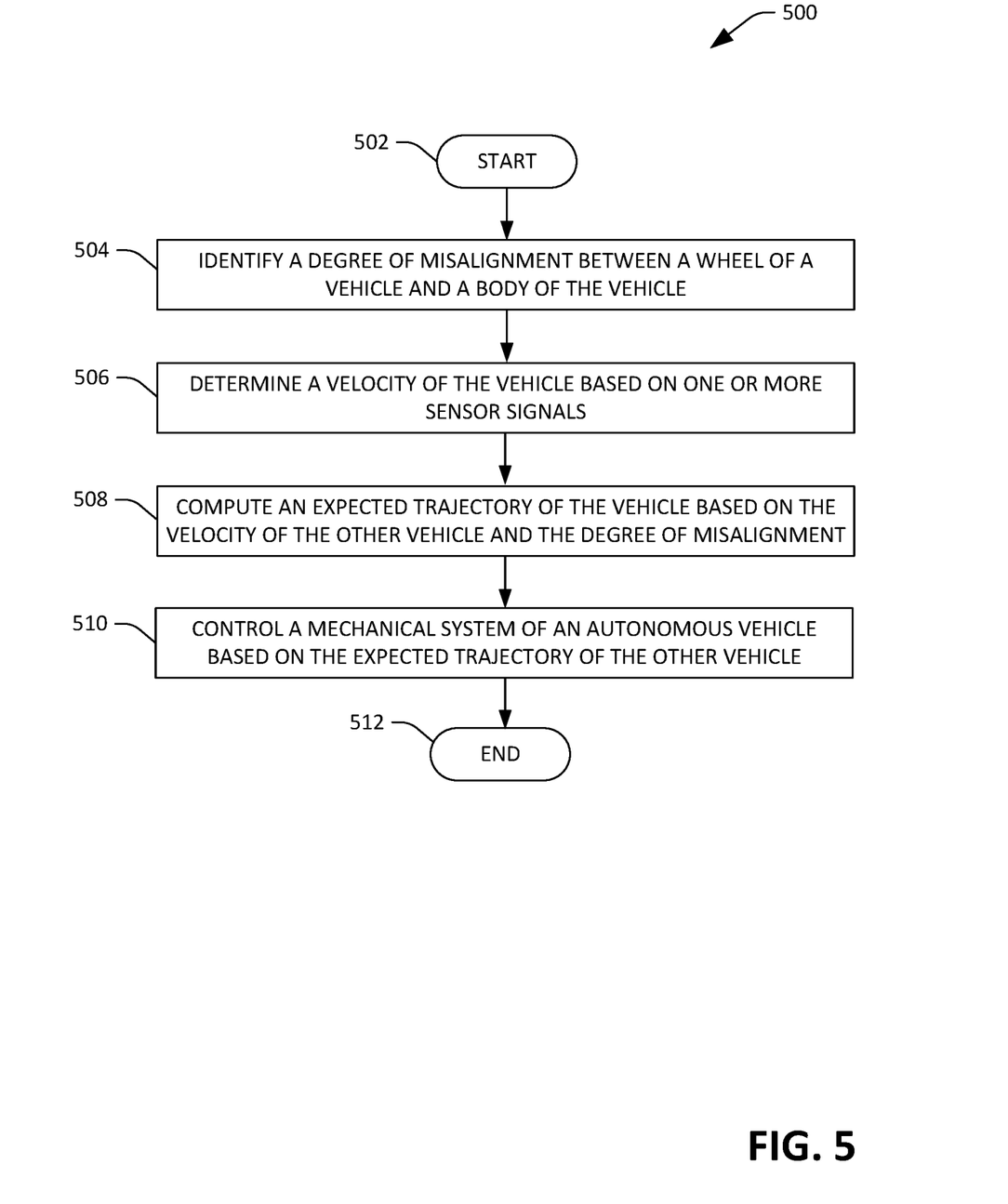
FIG. 5 is a flow diagram illustrating an exemplary methodology for controlling a mechanical system of an autonomous vehicle based on a predicted change in direction of another vehicle.
Figure 6:
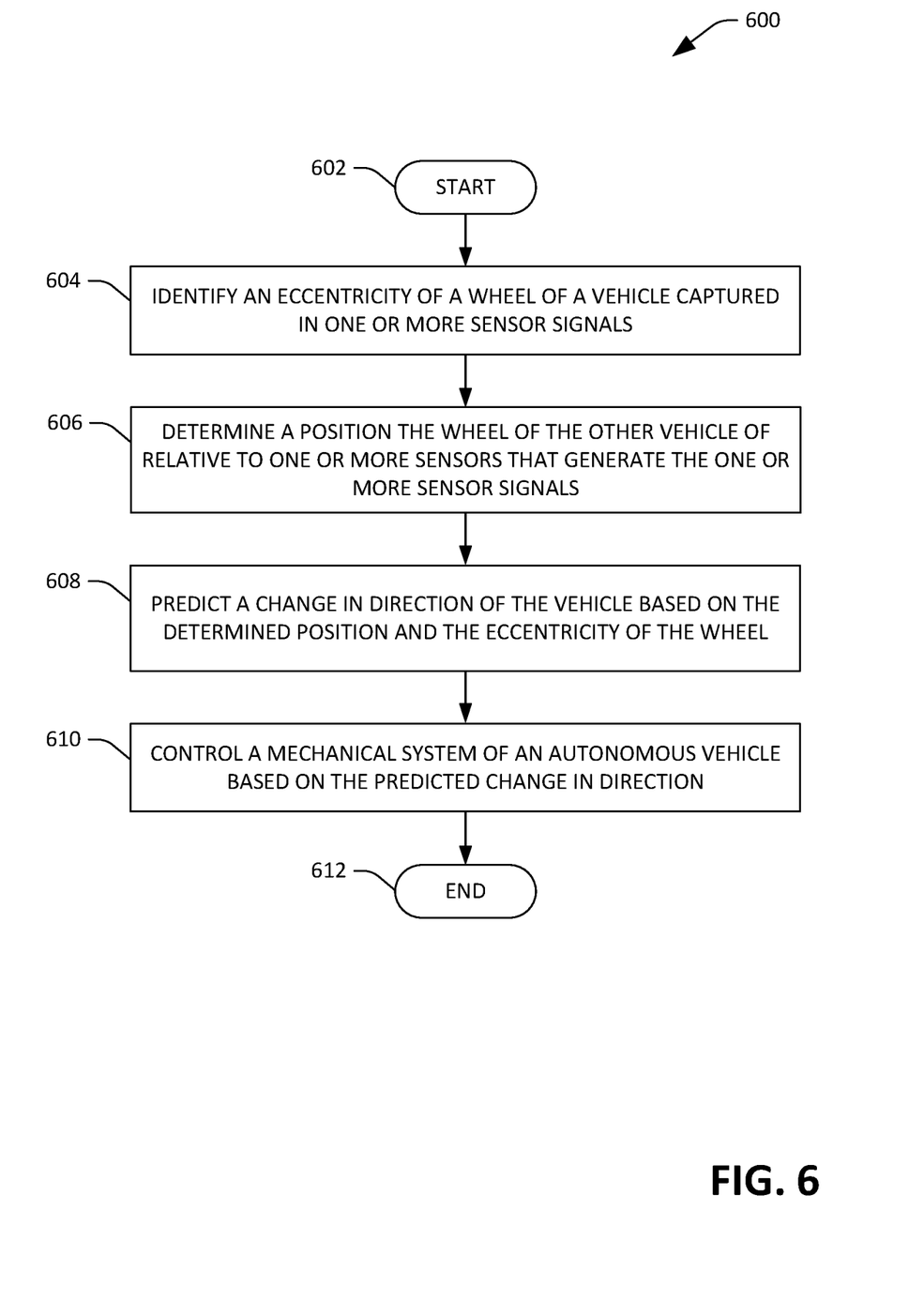
FIG. 6 is a flow diagram illustrating an exemplary methodology for controlling a mechanical system of an autonomous vehicle based on a predicted change in direction of another vehicle.

FIGS. 4-6 illustrate exemplary methodologies relating to predicting a change in direction and an amount of the change in direction of a vehicle based upon output of a sensor of an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, an exemplary methodology 400 executed by an autonomous vehicle is illustrated, wherein the methodology facilitates predicting a change in direction and amount of the change in direction of another vehicle that is proximate to the autonomous vehicle. The methodology 400 starts at 402, and at 404 a direction of travel of the other vehicle is identified based on one or more sensor signals generated by one or more sensors. The direction of travel may correspond to a lane of a road in which the other vehicle is travelling (e.g., the direction of travel may be parallel to the lane of the road). Additionally or alternatively, the direction of travel may correspond to forwardly motion of the other vehicle that results when the wheels of the other vehicle are arranged parallel to the body of the other vehicle.

At 406, an angle between a line that diametrically bisects a wheel of the other vehicle and the direction of travel is computed based on the sensor signals. The line that diametrically bisects the wheel of the other vehicle can be determined based on the sensor signals, which can include a lidar sensor signal, a camera signal, amongst others, wherein the sensor signals capture an orientation of the wheel relative to the sensors. For example, lidar points may be identified along the perimeter of the wheel to determine the orientation thereof. The line that diametrically bisects the wheel may be defined as a secant line that extends across the wheel and is not necessarily limited to a line that passes through a center of the wheel.

At 408, a mechanical system on an autonomous vehicle is controlled based upon the angle between the line and the longitudinal direction of travel. In a non-limiting example, the computed angle can be tracked over time, and the mechanical system of the autonomous vehicle can be controlled based upon a rate of change of the angle (i.e., the larger the rate of change, the more sudden the expected change in direction). The methodology 400 completes at 410.

Referring now to FIG. 5, an exemplary methodology 500 for predicting an aggressive cut-in and controlling an autonomous vehicle based upon the predicted cut-in is illustrated. The methodology 500 is performed by the computing system 110 of the autonomous vehicle 102. The methodology 500 starts at 502, and at 504 a degree of misalignment between a wheel of a vehicle and a portion of a body of the vehicle is identified based upon one or more sensor signals output by one or more sensors. The degree of misalignment is indicative of expected lateral movement by the other vehicle; for example, lateral movement from a current lane of travel to an adjacent lane of travel.

At 506, a velocity of the vehicle is determined based on the one or more sensor signals. For instance, the velocity of the vehicle may be computed based upon a radar signal generated by a radar sensor system of the autonomous vehicle. At 508, an expected trajectory of the vehicle is computed based on the identified degree of misalignment and the computed velocity. That is, the velocity, which is indicative of motion in a first direction, can be considered in combination with a degree of misalignment of the wheel relative to the portion of the body of the vehicle when identifying the expected trajectory of the vehicle. Further, the expected trajectory can be computed based upon changes in the degree of misalignment between the wheel and the portion of the body over time. The current position of the vehicle, the degree of misalignment, and/or changes to the degree of misalignment can be indicative of an aggressive cut-in of the vehicle into a lane of the autonomous vehicle. At 510, a mechanical system of the autonomous vehicle is controlled based on the expected trajectory of the vehicle. The methodology 500 completes at 514.

Referring now to FIG. 6, an exemplary methodology 600 that facilitates predicting a change in direction of a vehicle on a roadway (and an amount of the change in direction) is illustrated. The methodology 600 can be performed by the computing system 110 of the autonomous vehicle 102.

The methodology 600 starts at 602, and at 604 an eccentricity of a wheel of a vehicle is identified based on one or more sensor signals output by one or more sensor systems, wherein the wheel is in a field of view of the one or more sensor systems. The eccentricity of the wheel can be indicative of an imminent change in direction of the vehicle; for example, movement from a current lane of travel to an adjacent lane of travel.

At 606, a position of the wheel relative to the one or more sensor systems is determined based upon, for example, the sensor signals output by the one or more sensor systems and a profile of the autonomous vehicle.

At 608, a change in direction and an amount of the change in direction of the vehicle are predicted based on the position determined at 606 and the eccentricity of the wheel identified at 604. The position determined at 606 and the eccentricity identified at 604 are both employed when computing the change in direction and, as the identified eccentricity of the wheel (as captured in the one or more sensor signals) is a function of the position of the wheel relative to the one or more sensor systems. That is, even though an orientation of the wheel of the other vehicle relative to the body may be the same at two different instances in time, the eccentricity of the wheel can be different (as captured in the one or more sensor signals), as the eccentricity is based on the viewing angle and the distance of the one or more sensors with respect to the wheel. At 610, a mechanical system of the autonomous vehicle is controlled based on the predicted change in direction and the amount of change in direction of the other vehicle. The methodology 600 completes at 612.

Figure 7:
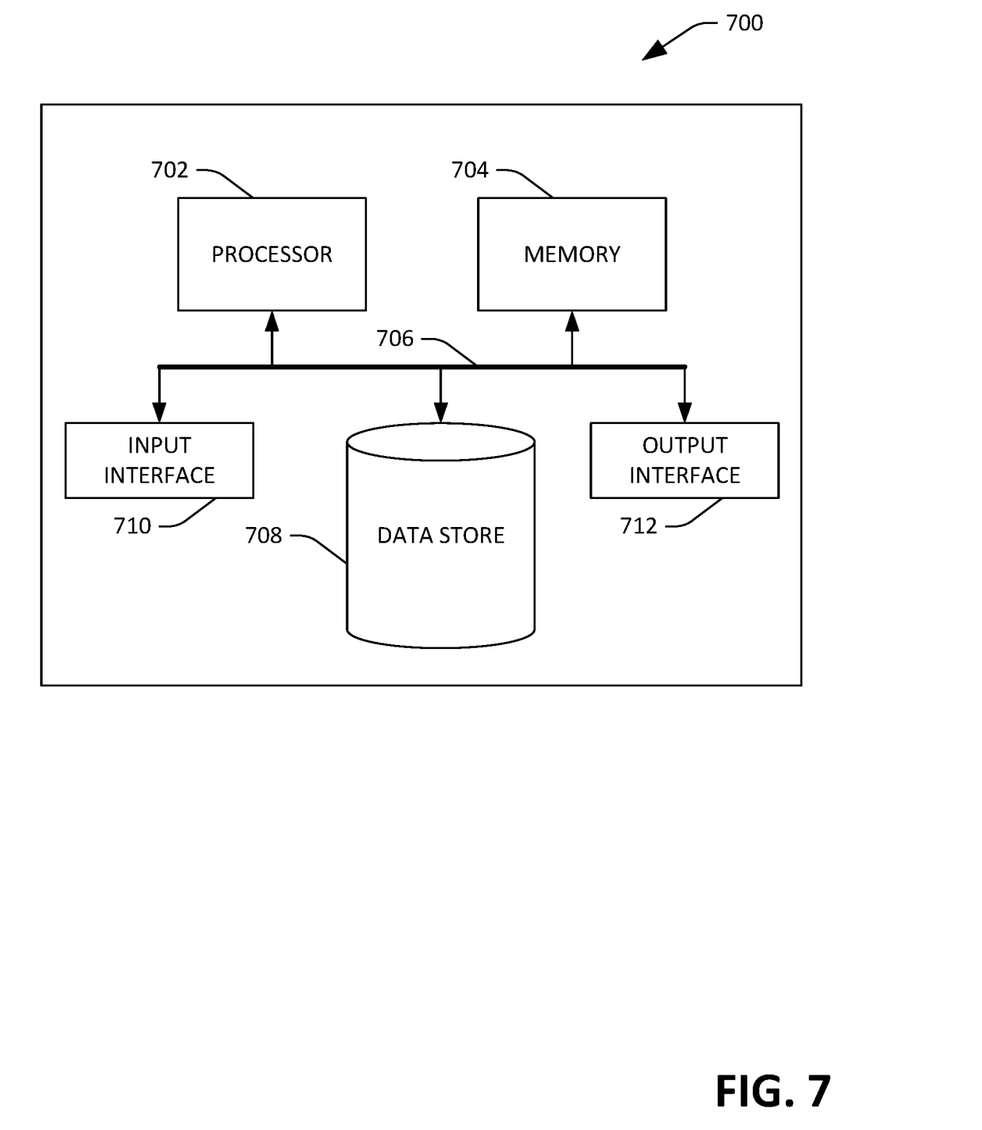
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 110. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store object tracking data, localization information, data tables, computed angles, etc.

The computing device 700 additionally includes a data store 708 that is accessible by the processor 702 by way of the system bus 706. The data store 708 may include executable instructions, object tracking data, localization information, data tables, confidence scores, and the like. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may transmit control signals to the vehicle propulsion system 206, the braking system 208, and/or the steering system 210 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
    a mechanical system;
    one or more sensors that generate one or more sensor signals;
    a computing system in communication with the mechanical system and the one or more sensors, wherein the computing system comprises:
        a processor; and
        memory that stores instructions that, when executed by the processor, cause the processor to perform acts comprising:
            identifying a direction of travel of a vehicle nearby the autonomous vehicle based on the one or more sensor signals generated by the one or more sensors;
            identifying an eccentricity of a wheel of the vehicle based on the one or more sensor signals generated by the one or more sensors;
            computing, based on the eccentricity of the wheel of the vehicle, an angle between a line that diametrically bisects the wheel of the vehicle and the direction of travel of the vehicle; and
            controlling the mechanical system of the autonomous vehicle based on the angle.

2. The autonomous vehicle of claim 1, the acts further comprising:
    determining a position of the one or more sensors relative to the wheel of the vehicle;
    wherein the angle is further computed based upon the position of the one or more sensors relative to the wheel of the vehicle.

3. The autonomous vehicle of claim 1, the acts further comprising:
    predicting that the vehicle is to bias toward a boundary of a lane in which the autonomous vehicle is travelling based upon the computed angle; and
    responsive to predicting that the vehicle is to bias toward the boundary of the lane in which the autonomous vehicle is travelling, inferring that the vehicle is maneuvering into the lane based upon the computed angle;
    wherein the mechanical system is further controlled based upon the inference that the vehicle is maneuvering into the lane.

4. The autonomous vehicle of claim 1, the acts further comprising:
    predicting a change in direction of the vehicle based upon the computed angle; and
    activating a horn of the autonomous vehicle based upon the change in direction.

5. The autonomous vehicle of claim 1, wherein controlling the mechanical system based upon the computed angle comprises biasing a position of the autonomous vehicle within a lane of the autonomous vehicle based upon the computed angle.

6. The autonomous vehicle of claim 1, the acts further comprising:
    determining a distance of the vehicle relative to the one or more sensors and a velocity of the vehicle in the direction of travel, wherein the mechanical system is controlled based upon the distance and the velocity of the vehicle.

7. The autonomous vehicle of claim 1, wherein identifying the direction of travel of the vehicle comprises:
    determining a first position of the vehicle at a first time; and
    determining a second position of the vehicle at a second time, wherein the direction of travel of the vehicle is identified based upon the first position and the second position.

8. The autonomous vehicle of claim 1, wherein the one or more sensors include at least one of an image sensor, a lidar sensor, or a thermal sensor.

9. An autonomous vehicle, comprising:
    a mechanical system;
    one or more sensors that generate one or more sensor signals;

a computing system in communication with the mechanical system and the one or more sensors, wherein the computing system comprises:
a processor; and
memory that stores instructions that, when executed by the processor, cause the processor to perform acts comprising:
identifying an eccentricity of a wheel of a vehicle nearby the autonomous vehicle based on the one or more sensor signals,
identifying, based on the eccentricity of the wheel of the vehicle, a degree of misalignment between the wheel of the vehicle and a portion of a body of the vehicle, wherein the degree of misalignment is indicative of expected lateral movement by the vehicle;
determining a longitudinal speed of the vehicle based on the one or more sensor signals;
computing an expected trajectory of the vehicle based on the longitudinal speed of the vehicle and the degree of misalignment; and
controlling the mechanical system based on the computed expected trajectory of the vehicle.

10. The autonomous vehicle of claim 9, the acts further comprising:
determining a position of the wheel of the vehicle relative to a position of the one or more sensors;
wherein the expected trajectory is further computed based upon the position of the wheel of the vehicle relative to the one or more sensors.

11. The autonomous vehicle of claim 9, the acts further comprising:
identifying that the vehicle is biasing toward a boundary of a lane in which the autonomous vehicle is travelling based upon the degree of misalignment; and
responsive to identifying that the vehicle is biasing toward the boundary, inferring that the vehicle is maneuvering into the lane based upon the degree of misalignment;
wherein the mechanical system is further controlled based upon the inference that the vehicle is maneuvering into the lane.

12. The autonomous vehicle of claim 9, wherein controlling the mechanical system based upon the expected trajectory comprises biasing a position of the autonomous vehicle within a lane of the autonomous vehicle based upon the expected trajectory.

13. The autonomous vehicle of claim 9, the acts further comprising:
determining a distance between the vehicle and the autonomous vehicle, wherein the mechanical system is further controlled based upon the distance.

14. The autonomous vehicle of claim 9, wherein the longitudinal speed of the vehicle is determined based upon a radar signal output by a radar sensor of the autonomous vehicle.

15. An autonomous vehicle, comprising:
a mechanical system;
one or more sensors that generate one or more sensor signals;
a computing system in communication with the mechanical system and the one or more sensors, wherein the computing system comprises:
a processor; and
memory that stores instructions that, when executed by the processor, cause the processor to perform acts comprising:
identifying an eccentricity of a wheel of a vehicle as captured in the one or more sensor signals generated by the one or more sensors;
determining a position of the wheel of the vehicle relative to the one or more sensors;
computing an expected lateral movement by the vehicle based upon:
the position of the wheel relative to the one or more sensors; and
the eccentricity of the wheel; and
controlling the mechanical system based on the expected lateral movement by the vehicle.

16. The autonomous vehicle of claim 15, the acts further comprising:
identifying that the vehicle is biasing toward a boundary of a lane in which the autonomous vehicle is travelling based upon the eccentricity of the wheel; and
responsive to identifying that the vehicle is biasing toward the boundary, inferring that the vehicle is maneuvering into the lane based upon the eccentricity of the wheel;
wherein the mechanical system is further controlled based upon the inference that the vehicle is maneuvering into the lane.

17. The autonomous vehicle of claim 15, wherein controlling the mechanical system based on the expected lateral movement comprises biasing a position of the autonomous vehicle within a lane of the autonomous vehicle based upon the expected lateral movement.

18. The autonomous vehicle of claim 15, the acts further comprising:
determining a longitudinal speed of the vehicle;
wherein the mechanical system is further controlled based upon the longitudinal speed of the vehicle.

19. The autonomous vehicle of claim 9, the acts further comprising:
predicting a change in direction of the vehicle based upon the expected trajectory of the vehicle; and
activating a horn of the autonomous vehicle based upon the change in direction.

20. The autonomous vehicle of claim 15, the acts further comprising:
predicting a change in direction of the vehicle based upon the expected lateral movement of the vehicle; and
activating a horn of the autonomous vehicle based upon the change in direction.

* * * * *